United States Patent
Park

(10) Patent No.: US 10,684,508 B2
(45) Date of Patent: Jun. 16, 2020

(54) BACKLIGHT UNIT AND DISPLAY DEVICE INCLUDING THE SAME

(71) Applicant: LG DISPLAY CO., LTD., Seoul (KR)

(72) Inventor: KiDuck Park, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/208,444

(22) Filed: Dec. 3, 2018

(65) Prior Publication Data

US 2019/0171066 A1 Jun. 6, 2019

(30) Foreign Application Priority Data

Dec. 6, 2017 (KR) .................. 10-2017-0167004

(51) Int. Cl.
*G02F 1/13357* (2006.01)
*G02F 1/1333* (2006.01)
*B29D 11/00* (2006.01)

(52) U.S. Cl.
CPC .. *G02F 1/133608* (2013.01); *B29D 11/00326* (2013.01); *G02F 1/133308* (2013.01); *G02F 1/133603* (2013.01); *G02F 1/133606* (2013.01); *G02F 1/133611* (2013.01); *G02F 2001/133322* (2013.01); *G02F 2001/133607* (2013.01)

(58) Field of Classification Search
CPC ... G02F 1/133611; G02F 2001/133607; G02F 1/133606; G02F 2202/28; G02B 5/02
See application file for complete search history.

(56) References Cited

U.S. PATENT DOCUMENTS

| | | | |
|---|---|---|---|
| 2006/0082698 A1* | 4/2006 | Ko | G02F 1/133606 349/61 |
| 2010/0328579 A1* | 12/2010 | Shim | G02B 5/02 349/64 |
| 2018/0039137 A1* | 2/2018 | Yamakawa | G02B 6/0088 |
| 2018/0372930 A1* | 12/2018 | Park | G02B 5/0278 |

FOREIGN PATENT DOCUMENTS

| | | |
|---|---|---|
| JP | 2007-157451 A | 6/2007 |
| JP | 2009-528571 A | 8/2009 |
| WO | 2016/136786 A1 | 9/2016 |

OTHER PUBLICATIONS

Office Action dated Nov. 12, 2019 issued in corresponding Japanese Patent Application No. 2018-228772.

* cited by examiner

*Primary Examiner* — Paisley L Wilson
*Assistant Examiner* — Mariam Qureshi
(74) *Attorney, Agent, or Firm* — Polsinelli PC

(57) ABSTRACT

Disclosed are a backlight unit and a display device including the same. The backlight unit and display device can minimize a change in an optical layer when exposed to hostile environments, such as high and low temperature environments. The backlight unit and the display device have a rigid structure, due to the minimized change in the optical layer even when exposed to hostile environments, such as high and low temperature environments.

20 Claims, 14 Drawing Sheets

BACKLIGHT UNIT AND DISPLAY DEVICE INCLUDING THE SAME

CROSS REFERENCE TO RELATED APPLICATION

This application claims priority to Korean Patent Application No. 10-2017-0167004, filed on Dec. 6, 2017, which is hereby incorporated by reference in its entirety for all purposes as if fully set forth herein.

BACKGROUND

Field of the Disclosure

The present disclosure relates to a display device, and more particularly, to a backlight unit and a display device including the same. Although the present disclosure is suitable for a wide scope of applications, it is particularly suitable for minimizing a change in an optical layer of the backlight unit in the display device when exposed to hostile environments, such as high and low temperature environments.

Description of Background

In response to the development of the information society, demand for a variety of display devices for displaying images is increasing. Various display devices, such as liquid crystal display (LCD) devices, plasma display panel (PDP) devices, and organic light-emitting diode (OLED) display devices, have recently come into widespread use.

Among such display devices, an LCD device displays an image by allowing light provided by a backlight unit to pass through a display panel by adjusting the orientations of liquid crystals of a liquid crystal layer of the display panel by controlling an electric field applied to the liquid crystal layer.

Backlight units can be categorized as direct backlight units, in which light sources are disposed below a display panel to directly irradiate light to the display panel, and an edge-type backlight units, in which a light guide plate is disposed below a display panel and light is irradiated from light sources disposed on one or more edges of the light guide plate. Direct backlight units are widely used due to advantages, such as high light use efficiency, a simple configuration, and ease of unit enlargement.

Such an LCD device includes a plurality of optical layers comprised of a plurality of plates or films stacked on each other to uniformly diffuse light irradiated from light sources, thereby creating an area light source, or improve the luminance of light.

When the optical layers are exposed to heat generated by the operation of a display panel, or the like, or to a low-temperature environment, the optical layers comprised of plates or films can be contracted or expanded, so that wrinkles can be generated therein.

Due to the contraction and expansion of the optical layers, the coupling force between a chassis structure fixing a display device and the optical layers may be reduced, so that the optical layers may not be firmly fixed, which is problematic.

Such an undesirable change in the optical layers can degrade display performance and cause an adverse effect on display performance. Accordingly, an improvement regarding the optical layers is necessary.

SUMMARY

Various aspects of the present disclosure provide a backlight unit and a display device configured to minimize a change in an optical layer when exposed to hostile environments, such as high and low temperature environments.

Also provided are a backlight unit and a display device having a structure that can prevent or reduce an effect on display performance, due to light sources being recognized in an active area of a display panel.

Also provided are a backlight unit and a display device configured to prevent luminance degradations in a display panel while firmly fixing a chassis structure and an optical layer, thereby improving display performance.

The present disclosure is not limited to the aforementioned description, and other objects not explicitly disclosed herein will be clearly understood by a person skilled in the art to which the present disclosure pertains from the description provided hereinafter.

In an aspect of the present disclosure, provided are a backlight unit and a display device, in which a plurality of optical sheets are bonded to each other, with voids being provided at regular intervals between the optical sheets.

Also provided are a backlight unit and a display device, in which a diffuser plate is situated between a luminance enhancement film and an optical sheet.

According to exemplary aspects, the backlight unit and the display device have a rigid structure, since a change in the optical layer is minimized even when exposed to hostile environments, such as high and low temperature environments.

In addition, according to exemplary aspects, the backlight unit and the display device can have a structure minimizing an effect on display performance by preventing the light sources from being directly recognized in the active area of the display panel.

Furthermore, according to exemplary aspects, the backlight unit and the display device can improve display performance by prevent degradations in the luminance and screen quality of the display panel.

BRIEF DESCRIPTION OF THE DRAWINGS

The above and other objects, features, and advantages of the present disclosure will be more clearly understood from the following detailed description when taken in conjunction with the accompanying drawings, in which.

DETAILED DESCRIPTION

Figure 1:
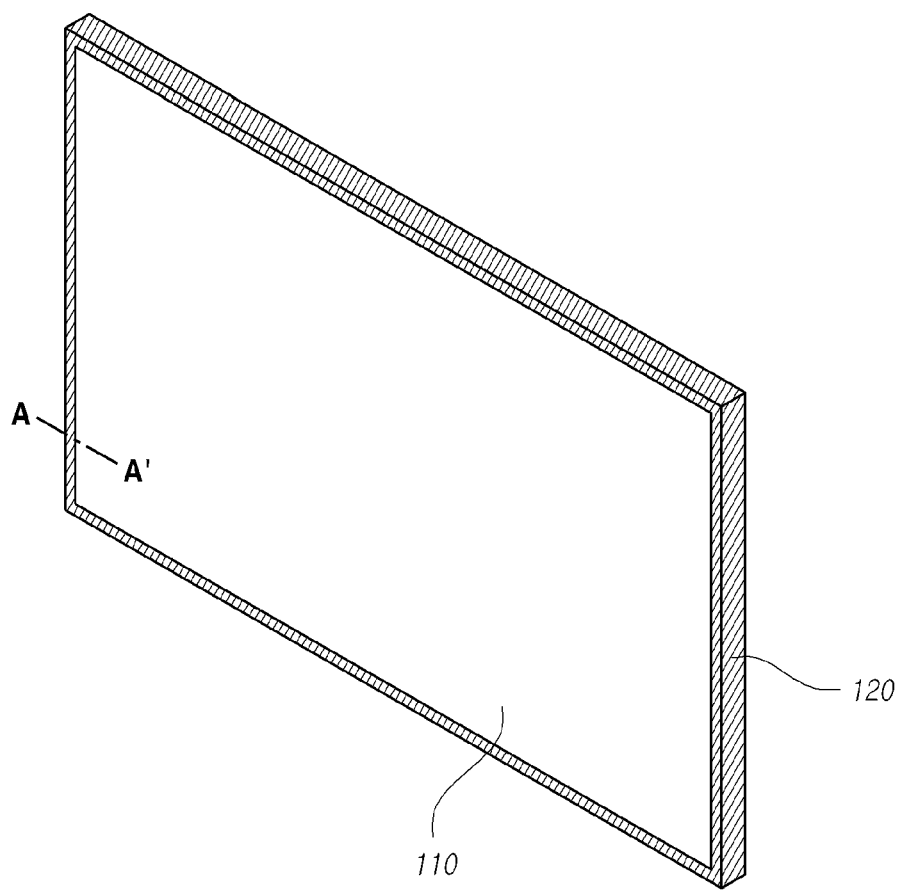
FIG. 1 is a perspective view illustrating a display device according to an exemplary aspect of the present disclosure.

Hereinafter, reference will be made to aspects of the present disclosure in detail, examples of which are illustrated in the accompanying drawings. Throughout this document, reference should be made to the drawings, in which the same reference numerals and symbols will be used to designate the same or like components. In the following description of the present disclosure, detailed descriptions of known functions and components incorporated herein will be omitted in the case that the subject matter of the present disclosure may be rendered unclear thereby.

It will also be understood that, while terms such as "first," "second," "A," "B," "(a)," and "(b)" may be used herein to describe various elements, such terms are merely used to distinguish one element from other elements. The substance, sequence, order, or number of such elements is not limited by these terms. It will be understood that when an element is referred to as being "connected to" or "coupled to" another element, not only can it be "directly connected or coupled to" the other element, but it can also be "indirectly connected or coupled to" the other element via an "intervening" element.

Figure 2:
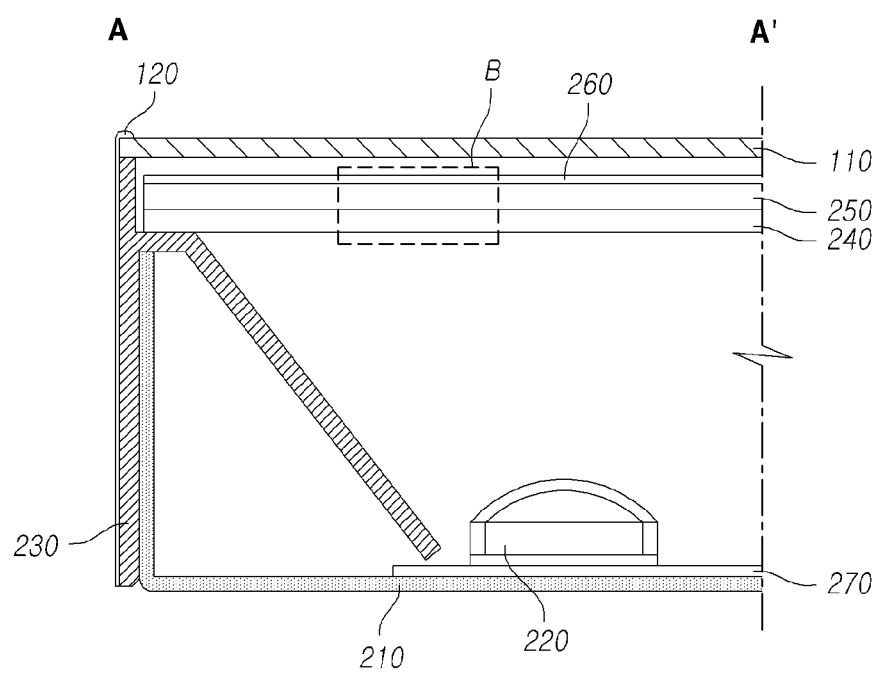
FIG. 2 is a cross-sectional view of the display device illustrated in FIG. 1.
Figure 3:
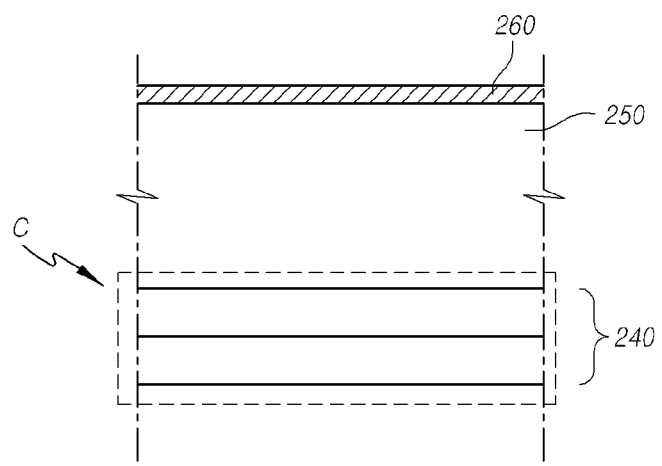
FIG. 3 is an enlarged view illustrating components of the display device according to an exemplary aspect.
Figure 4:
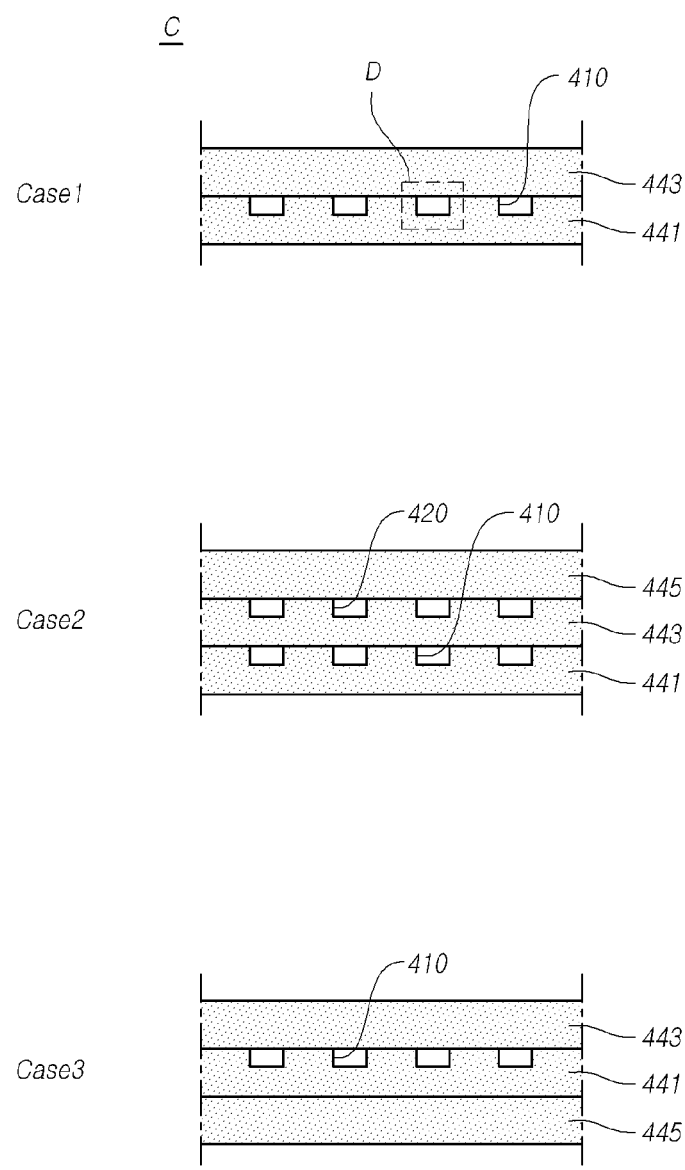
FIG. 4 illustrates examples of components in FIG. 3.
Figure 5:
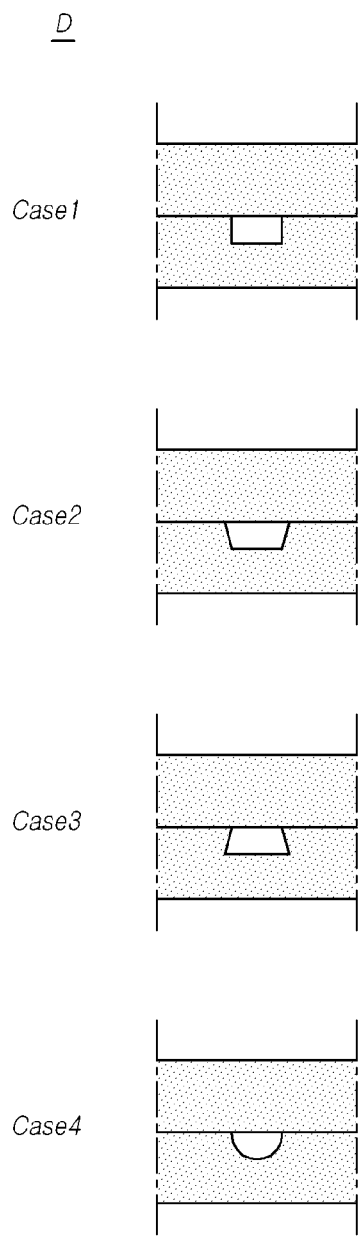
FIG. 5 illustrates examples of a portion in FIG. 4.
Figure 6:
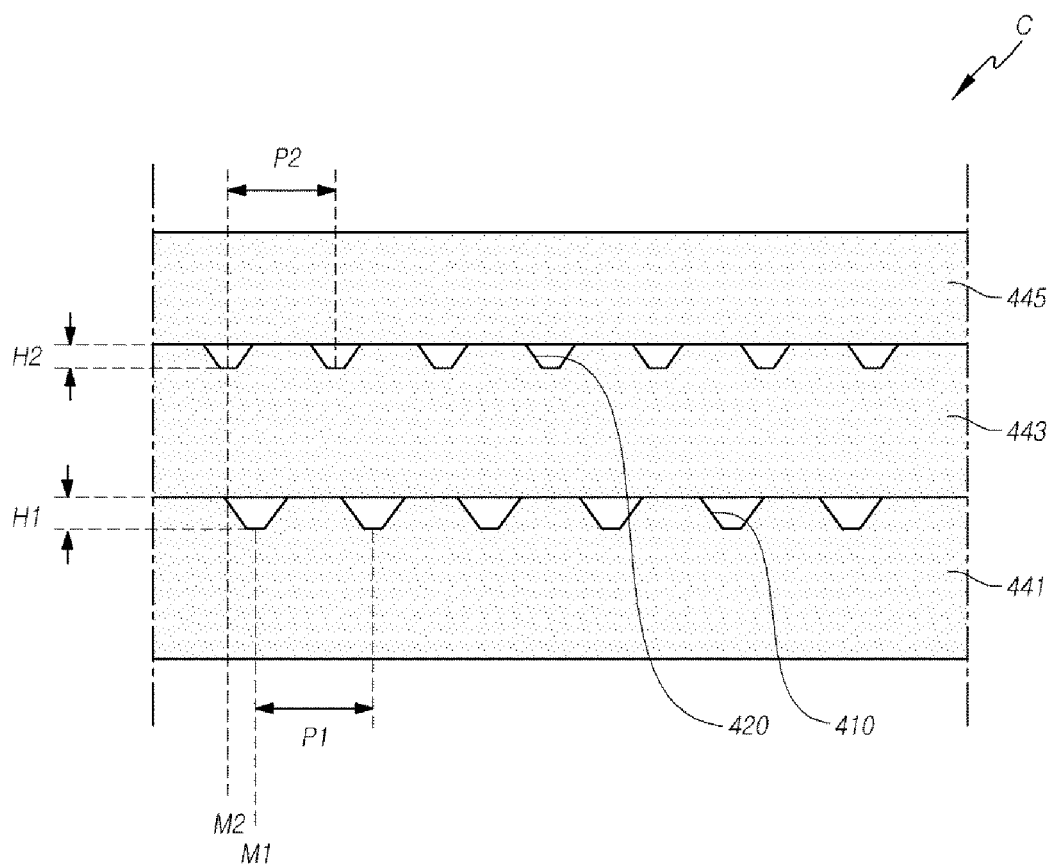
FIG. 6 illustrates an alternative aspect of FIG. 4.
Figure 7:
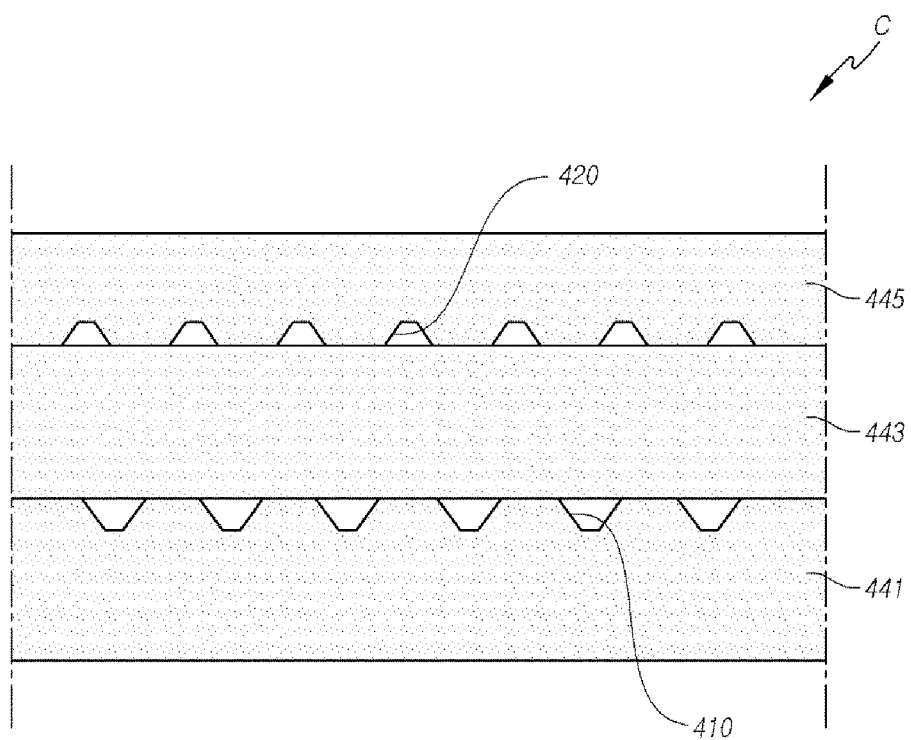
FIG. 7 illustrates an alternative aspect of FIG. 4.
Figure 8:
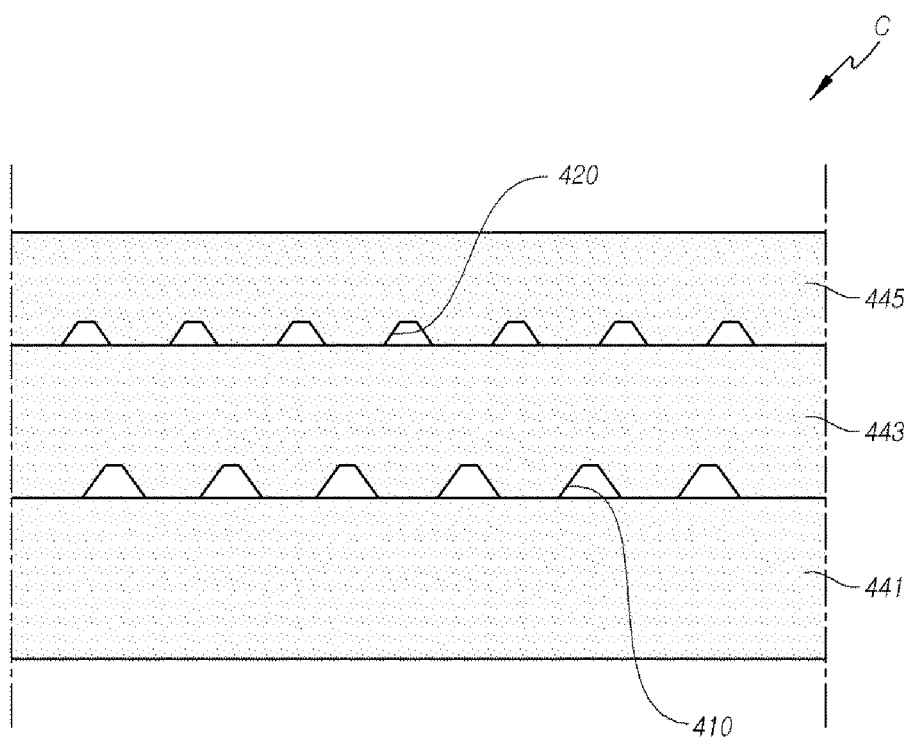
FIG. 8 illustrates an alternative aspect of FIG. 4.
Figure 9:
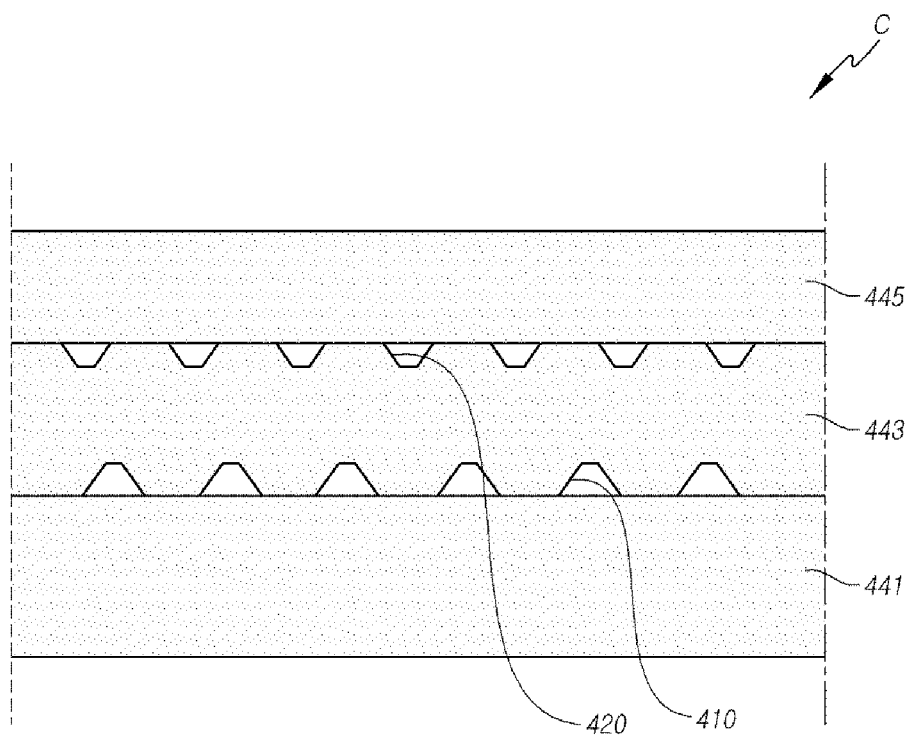
FIG. 9 illustrates an alternative aspect of FIG. 4.
Figure 10:
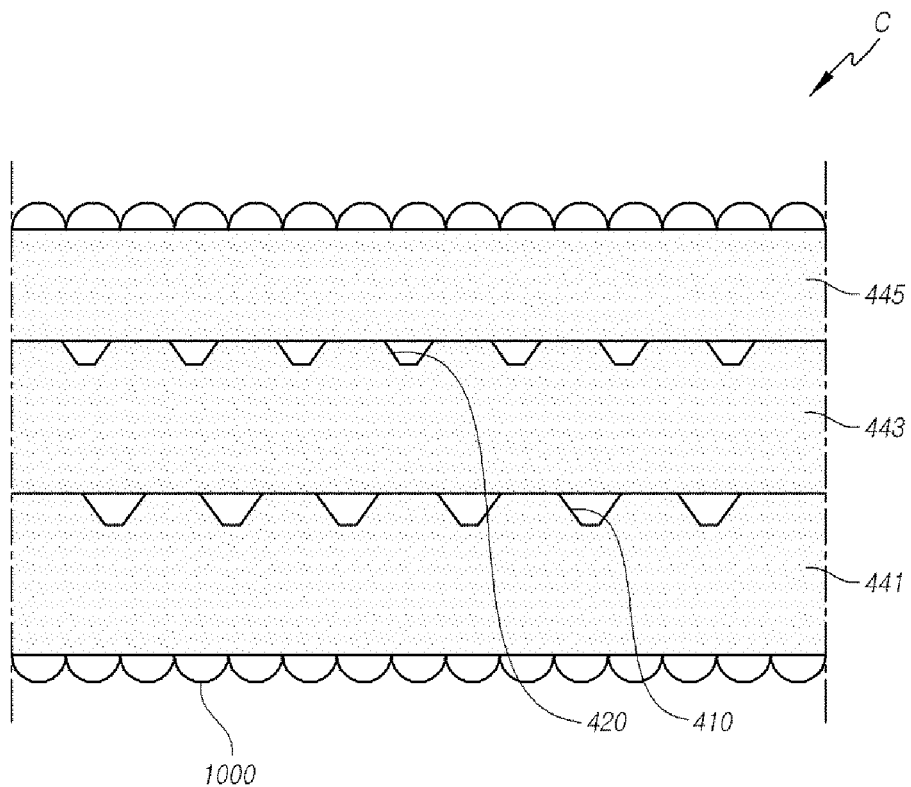
FIG. 10 illustrates an alternative aspect of FIG. 4.
Figure 11:
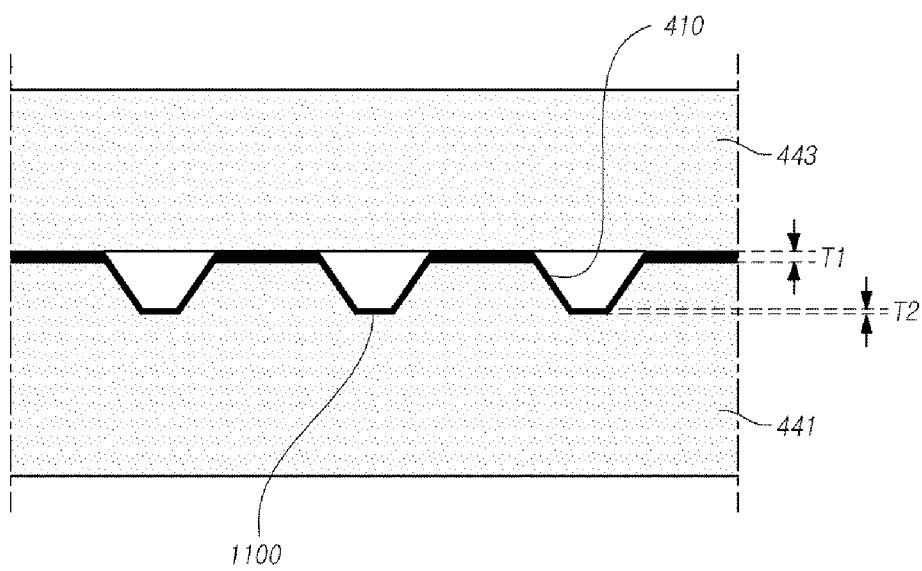
FIG. 11 is an enlarged view illustrating the components in FIG. 6.
Figure 12:
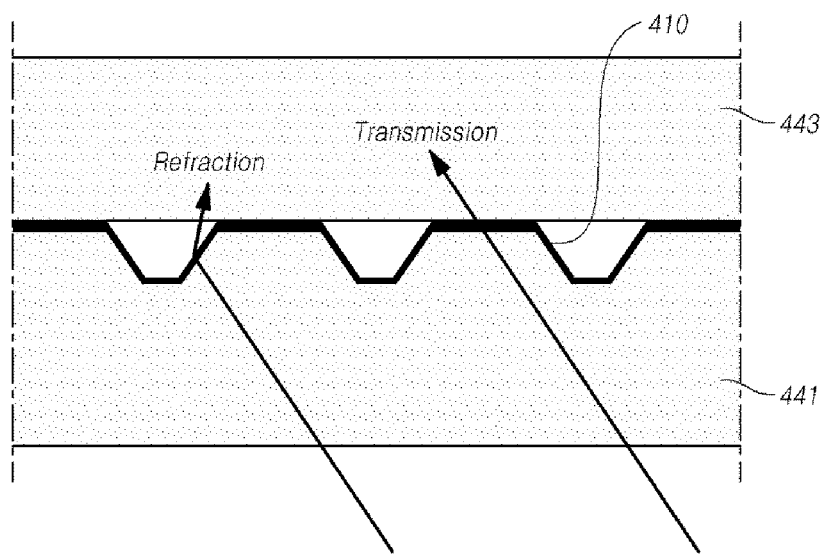
FIG. 12 is an enlarged view illustrating the components in FIG. 6.
Figure 13:
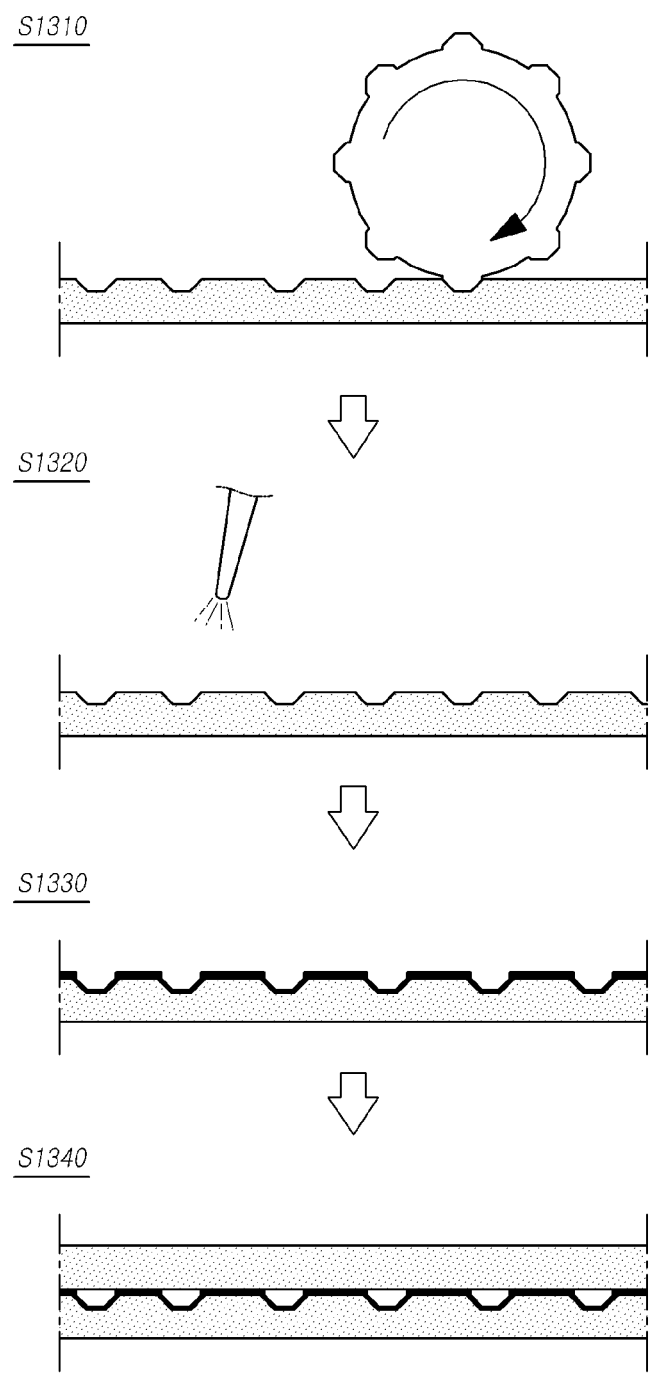
FIG. 13 illustrates an exemplary method of fabricating components of the display device according to an exemplary aspect.
Figure 14:
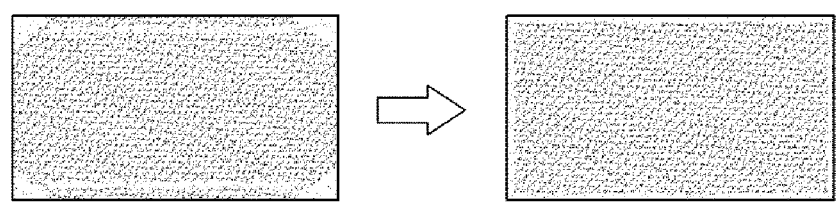
FIG. 14 is a conceptual view illustrating effects according to an exemplary aspect of the present disclosure.

FIG. 1 is a perspective view illustrating a display device according to an exemplary aspect of the present disclosure, FIG. 2 is a cross-sectional view of the display device illustrated in FIG. 1, FIG. 3 is an enlarged view illustrating components of the display device according to an exemplary aspect, FIG. 4 illustrates examples of the components in FIG. 3, FIG. 5 illustrates examples of a portion in FIG. 4, FIG. 6 illustrates an alternative aspect of FIG. 4, FIG. 7 illustrates an alternative aspect of FIG. 4, FIG. 8 illustrates an alternative aspect of FIG. 4, FIG. 9 illustrates an alternative aspect of FIG. 4, FIG. 10 illustrates an alternative aspect of FIG. 4, FIG. 11 is an enlarged view illustrating components in FIG. 6, FIG. 12 is an enlarged view illustrating the components in FIG. 6, FIG. 13 illustrates an exemplary method of fabricating components of the display device according to exemplary aspect, and FIG. 14 is a conceptual view illustrating effects according to an exemplary aspect.

FIG. 1 is a perspective view illustrating a display device according to an exemplary aspect.

Referring to FIG. 1, a display device 100 includes a display panel 110, a backlight unit providing light to the display panel 110, and a chassis structure.

The display panel 110 may be one of a liquid crystal display (LCD) device, a plasma display panel (PDP) device, a field emission display (FED) device, an electroluminescence display (ELD) device, and an organic light-emitting diode (OLED) display device.

Hereinafter, for the sake of brevity, reference will be made, by way of example, to an LCD device that displays an image by allowing light provided by a backlight unit to pass through the display panel 110 by adjusting the orientations of liquid crystals of a liquid crystal layer of the display panel 110 by controlling an electric field applied to the liquid crystal layer.

A case top 120 is a chassis structure protecting front peripheral portions and side portions of the display panel 110 by covering the front peripheral and the side portions from the outside.

The case top 120 may be provided by connecting separate side members, disposed on four edges of the display panel 110. Alternatively, the four side members of the case top 120 may be provided integrally by processing and bending a single original plate. The case top 120 may be omitted in some cases, and another chassis structure of the display device 100, having a similar function, may substitute for the case top 120.

The display device 100 may include, in addition to the case top 120 protecting the front peripheral portions and the side portions of the display panel 110 by covering the front peripheral and side portions from the outside, a cover bottom 210 (shown in FIG. 2) disposed below the display panel 110 to protect the backlight unit. The cover bottom 210 is generally made of metal.

This structure will be described in detail with reference to FIG. 2, a cross-sectional view taken along line A-A' in FIG. 1. Referring to FIG. 2, the display device 100 may include the case top 120 covering the front peripheral portions and the side portions of the display panel 110 and the cover bottom 210 located below the display panel 110.

The cover bottom 210 supports a bottom portion of an optical sheet layer 240 and a bottom portion of the display panel 110 of the display device 100, and is typically made of metal, such as electrolytically galvanized iron (EGI), to protect internal structures of the display device 100, such as the backlight unit.

The cover bottom 210 may have vertical side portions on peripheral portions of the rectangular shape thereof to be perpendicular to the horizontal top surface of the cover bottom 210, thereby protecting side surfaces of a structure, such as the backlight unit.

The backlight unit is located above the cover bottom 210.

The backlight unit includes a plurality of light sources 220 and an optical sheet layer 240, which will be described later. The backlight unit may further include a diffuser plate 250, which will be described later, and a luminance enhancement film 260.

The light sources 220 are located on the cover bottom 210. The light sources 220 may be light-emitting diodes (LEDs).

The light sources 220 may be arranged according to the configuration of an edge-type backlight or a direct backlight, depending on the display type of the display device 100.

The edge-type LCD may include a reflector sheet (not shown) and a light guide plate (not shown) within the cover bottom 210. The light sources 220 may be disposed on an edge of the light guide plate, within the cover bottom 210.

However, in FIG. 2, the light sources 220 are illustrated as being arranged according to the configuration of the edge-type backlight. Hereinafter, for the sake of brevity, the light sources 220 will be described as being arranged according to the configuration of the direct backlight by way of example.

The light sources 220, arranged according to the configuration of the direct backlight, may be disposed on the top surface of the cover bottom 210, and may be a module including a printed circuit board (PCB) and LED chips. A reflector 270 may be disposed below the light sources 220 to reflect light having exited the light sources 220, thereby improving light efficiency.

The optical sheet layer 240 comprised of a plurality of optical sheets may be provided on a path of light that has exited the light sources 220, more particularly, above the light sources 220 when the light sources 220 are arranged according to the configuration of the direct backlight.

Lower peripheral portions of the optical sheet layer 240 may be supported by the vertical side portions of the cover bottom 210.

In some cases, a guide panel 230 may further be provided on the chassis structure. The guide panel 230 is located outside the cover bottom 210 to support the bottom portion of the optical sheet layer 240 and the bottom portion of the display panel 110. The guide panel 230 supports the bottom peripheral portions of the optical sheet layer 240.

The guide panel 230 is vertically located outside the vertical side portion of the cover bottom 210. The guide panel 230 may have a slope protruding between the edge of the vertical side portion of the cover bottom 210 and the display panel 110, inclined toward the top surface of the cover bottom 210.

In this case, the bottom peripheral portions of the optical sheet layer 240 may be supported by the guide panel 230 while being located between the display panel 110 and a portion of the guide panel 230 protruding between the edge of the vertical side portion of the cover bottom 210 and the display panel 110.

In some cases, the guide panel 230 may be provided with an accommodation space in which a circuit board or PCB (not shown) connected to driving devices (not shown) for driving the display panel 110 can be accommodated.

The driving devices are electrically connected to bonding pads of the display panel 110. The driving devices may be chip-on-film (COF) driving devices connected to the bonding pads via a circuit film (not shown), or a flexible printed circuit (FPC).

One edge of the circuit film is bonded to bonding pads of the display panel 110, while the other edge of the circuit film is bonded to the circuit board. The driving devices are mounted on the circuit film.

Due to the accommodation space provided in the guide panel 230, the circuit board and the COF driving devices connected to the circuit board can be located within the chassis structure.

Alternatively, the driving devices may be connected to the display panel 110 using any other technology, such as taper carrier package (TCP) scheme or chip-on-glass (COG) scheme, which is well known in the art. In this case, a separate accommodation space may not be required in the guide panel 230.

The diffuser plate 250 may be located above the optical sheet layer 240, and the luminance enhancement film 260 may be located above the diffuser plate 250 and below the display panel 110.

The diffuser plate 250 may be made of a transparent material a material having haze properties, including particles, a pattern, or the like. The diffuser plate 250 is a component acting to provide an overall area light source by refracting and diffusing light having exited the light sources 220. The diffuser plate 250 may be made of a plastic resin, such as polyester, polystyrene, polyethylene terephthalate (PET), or polycarbonate (PC), in which a light diffusing agent, a pattern, or the like, may be included.

In the case in which the diffuser plate 250 is made of a plastic resin, such as polyester and polycarbonate, the diffuser plate 250 may be deformed, for example, contracted or expanded, when exposed to heat generated from the display panel 110 or repeatedly exposed to a high-temperature environment.

For example, when the diffuser plate 250 is made of polycarbonate with a thickness of about 1000 mm, the diffuser plate 250 may be subjected to expansion of about 2 mm when temperature changes from 25° C., i.e., room temperature, to 60° C.

Accordingly, the diffuser plate 250 may be made of transparent glass to minimize thermal deformation.

For example, when the diffuser plate 250 is made of glass and has the same thickness as above, the diffuser plate 250 may be subjected to expansion of only about 0.3 mm in response to the same temperature change.

Accordingly, the thermal deformation of the diffuser plate 250 can be minimized, and the deformation of the optical sheet layer 240 bonded to the diffuser plate 250 can also be minimized.

The minimized deformation of the optical sheet layer 240 can prevent the structures, such as the optical sheet layer 240 and the diffuser plate 250 above the optical sheet layer 240, from being detached from the guide panel 230, even in the case in which the support space of the guide panel 230, supporting the optical sheet layer 240, is reduced by a narrow bezel structure.

In addition, when the diffuser plate 250 is made of glass, the diffuser plate 250 may have, for example, a diffuser pattern on the top portion thereof to refract and diffuse light having exited the light sources 220. The glass diffuser plate 250 can further improve the luminance of the display panel 110, since the glass diffuser plate 250 is more transparent than the above-described plastic diffuser plate 250.

In addition, the bottom surface of the diffuser plate 250 may be bonded to the top surface of the optical sheet layer 240.

As described above, the diffuser plate 250 is located above the optical sheet layer 240, and the bottom surface of the diffuser plate 250 is bonded to the top surface of the optical sheet layer 240. Due to this configuration, heat generated by the display panel 110 is blocked by the highly-heat resistant diffuser plate 250 before being transferred to the optical sheet layer 240, and the optical sheet layer 240 is bonded to the planar bottom surface of the diffuser plate 250. Accordingly, the optical sheets of the optical sheet layer 240 can be prevented from being wrinkled by heat.

In addition, a luminance enhancement film 260, located above the diffuser plate 250 and below the display panel 110, may be a dual bright enhancement film (DBEF). The luminance enhancement film 260 may be bonded and fixed to the top portion of the diffuser plate 250.

FIG. 3 is an enlarged view illustrating some components of the display device according to an exemplary aspect.

FIG. 3 is an enlargement of part B in FIG. 2, illustrating the optical sheet layer 240, the diffuser plate 250 located above the optical sheet layer 240, and a luminance enhancement film 260 located above the diffuser plate 250.

Described in detail with reference to FIG. 4, the optical sheet layer 240 may include a first optical sheet 441 that light having exited the light sources 220 enters and a second optical sheet 443 located above the first optical sheet 441, such that light having exited the first optical sheet 441 enters the second optical sheet 443.

The optical sheet layer 240 is a component to provide an area light source by diffusing light having exited the light sources 220. In particular, when the light sources 220 are arranged according to the configuration of a direct backlight, the optical sheet layer 240 can act to reduce a hot-spot phenomenon, in which light sources 220 are recognizable, by diffusing exiting light.

The optical sheets, i.e., the first optical sheet 441 and the second optical sheet 443, may be made of, for example, PET. Each of the optical sheets may be a film or a plate having a refractive index in a range of 1.5 to 1.6. Each of the optical sheets may be a film or a plate that has a light-diffusing property, due to a light diffusing agent, a pattern, or the like, being included therein.

The first optical sheet 441 and the second optical sheet 443 may be stacked on each other, with corresponding surfaces thereof being bonded to each other.

Voids may be provided in the bonding area of the first optical sheet 441 and the second optical sheet 443, more particularly, in a plurality of first recesses 410 depressed inwardly from one surface, i.e., the bonding surface, of the first optical sheet 441 or the second optical sheet 443.

The refractive index of the voids is 1, due to air contained the voids. The optical sheets of the optical sheet layer 240 may be films or plates made of PET, the refractive index of which is 1.5 to 1.6, as described above. Accordingly, light entering the optical sheet layer 240 may be refracted and diffused in the regions in which the voids are located. This feature will be described in detail later.

The optical sheet layer 240 may further include a third optical sheet 445, which is bonded to the bottom surface of the first optical sheet 441 or the top surface of the second optical sheet 443 while being stacked thereon.

Referring to Case 2 in FIG. 4, the third optical sheet 445 may be stacked on the second optical sheet 443 while being bonded to the top surface of the second optical sheet 443. Referring to Case 3 in FIG. 4, the third optical sheet 445 may be stacked below the first optical sheet 441 while being bonded to the bottom surface of the first optical sheet 441.

When the optical sheet layer 240 is comprised of three optical sheets, further including the third optical sheet 445, light exiting the light sources 220 may be more efficiently diffused, due to the light-diffusing characteristic of the optical sheets of the optical sheet layer 240.

As in Case 2 in FIG. 4, when the third optical sheet 445 is stacked on the second optical sheet 443 while being bonded to the top surface of the second optical sheet 443, voids may be provided in a plurality of second recesses 420 depressed inwardly from the bonding surface of the second optical sheet 443 or the third optical sheet 445, in the bonding area between the second optical sheet 443 and the third optical sheet 445.

In this case, the voids included in the optical sheet layer 240 are provided as dual layers located in the plurality of first recesses 410 present between the first optical sheet 441 and the second optical sheet 443 and the plurality of second recesses 420 present between the second optical sheet 443 and the third optical sheet 445, as described above.

This accordingly allows light having exited the light sources 220 to be refracted twice through the plurality of first recesses 410 and the plurality of second recesses 420 of the optical sheet layer 240, thereby maximizing the diffusion of light.

The plurality of first recesses 410 and the plurality of second recesses 420 may be arranged at regular distances.

In this case, the voids included in the optical sheet layer 240 are uniformly distributed instead of being concentrated in specific locations, thereby uniformly diffusing light over the entire area. In addition, the optical sheets of the optical sheet layer 240 are uniformly bonded to each other, thereby reducing the possibility that the stacked optical sheets are delaminated.

Although each recess of the plurality of first recesses 410 and the plurality of second recesses 420 may have the shape of an inverted trapezoid, the present disclosure is not limited thereto. As illustrated in FIG. 5, the shape of the recesses may be selected from among a variety of shapes, such as a trapezoid, a polygon, a circle, and an ellipse, in order to improve the diffusion of light by the voids.

In addition, the plurality of first recesses 410 and the plurality of second recesses 420 may have the same size or different sizes, depending on the required light diffusion characteristic.

FIG. 6 illustrates another example of Case 2 in FIG. 4, i.e., an alternative aspect of FIG. 4. In FIG. 6, the first optical sheet 441, the second optical sheet 443, and the third optical sheet 445 are illustrated as being stacked on each other.

Voids are provided in the bonding area between the first optical sheet 441 and the second optical sheet 443, as described above. The voids are located in the plurality of first recesses 410 depressed inwardly from the bonding surface of the first optical sheet 441 or the second optical sheet 443.

In addition, voids are provided in the bonding area between the second optical sheet 443 and the third optical sheet 445. The voids are located in the plurality of second recesses 420 depressed inwardly from the bonding surface of the second optical sheet 443 or the third optical sheet 445.'

Although the first recesses 410 and the second recesses 420 are illustrated as having the shape of an inverted trapezoid in FIG. 6, the present disclosure is not limited thereto, and this shape is selected for the sake of brevity.

The plurality of first recesses 410 may be provided at regular distances, depressed inwardly from the bonding surface of the first optical sheet 441 or the second optical sheet 443.

Specifically, the plurality of first recesses 410 may be provided in the bonding surface of the first optical sheet 441 at regular distances or in the bonding surface of the second optical sheet 443 at regular distances.

Referring to FIGS. 6 to 9, the first recesses 410 illustrated in FIGS. 6 and 7 are provided as a plurality of recesses depressed inwardly from the bonding surface of the first optical sheet 441, whereas the first recesses 410 illustrated in FIGS. 8 and 9 are provided as a plurality of recesses depressed inwardly from the bonding surface of the second optical sheet 443.

Likewise, the plurality of second recesses 420 may be provided at regular distances, depressed inwardly from the bonding surface of the second optical sheet 443 or the third optical sheet 445. Accordingly, while the second recesses 420 illustrated in FIGS. 6 and 9 are provided at regular distances, depressed inwardly from the bonding surface of the second optical sheet 443, the second recesses 420 illustrated in FIGS. 7 and 8 are provided at regular distances, depressed inwardly from the bonding surface of the third optical sheet 445.

As described above, when the plurality of first recesses 410 or the plurality of second recesses 420 are selectively provided in one surface of two optical sheets bonded to each other, light diffusion characteristics obtained through the optical sheet layer 240 may be partially varied.

For example, when the first recesses 410 are provided in the first optical sheet 441 and the second recesses 420 are provided in the second optical sheet 443, as illustrated in FIG. 6, light refraction through voids only occurs in the first optical sheet 441 and the second optical sheet 443.

In contrast, when the first recesses 410 are provided in the first optical sheet 441 and the second recesses 420 are provided in the second optical sheet 445, as illustrated in FIG. 7, light refraction through voids only occurs in the first optical sheet 441 and the third optical sheet 445.

When compared to FIG. 6, light refracted in the first recesses 410 travels through the second optical sheet 443 without being refracted, and is then refracted in the second recesses 420 of the third optical sheet 445. Consequently, light is further refracted in the higher area.

As described above, light diffusion characteristics can be adjusted by varying the bonding structure of the optical sheets, in which the recesses are depressed at regular distances, thereby facilitating the fabrication of the optical sheet layer 240 having different optical characteristics as required.

For example, when the first recesses 410 and the second recesses 420 are provided in the bottom surface and the top surface of the second optical sheet 443, as illustrated in FIG. 9, it is not necessary to provide the recesses in either the first optical sheet 441 or the third optical sheet 445. Accordingly, it is easy to laminate the optical sheets of the optical sheet layer 240 and to minimize misalignment of voids, which are arranged in dual layers, during the lamination.

Returning to FIG. 6, the distances (or pitches) P1 between the plurality of first recesses 410 and the distances P2 between the plurality of second recesses 420 may differ.

The distances P1 between the plurality of first recesses 410 and the distances P2 between the plurality of second recesses 420 may be variously adjusted depending on light diffusion characteristics. For example, the distances P1 between the plurality of first recesses 410 may be adjusted to be smaller than the distances P2 between the plurality of second recesses 420.

Alternatively, the distances P1 between the plurality of first recesses 410 may be greater than the distances P2 between the plurality of second recesses 420 (P1>P2). For example, the distances P1 between the plurality of first recesses 410 may be 210 μm, and the distances P2 between the plurality of second recesses 420 may be 200 μm.

In addition, the depths H1 of the plurality of first recesses 410 and the depths H2 of the plurality of second recesses 420 may variously adjusted, for example, to differ depending on light diffusion characteristics.

Alternatively, the depths H1 of the plurality of first recesses 410 may be greater than the depths H2 of the plurality of second recesses 420 (H1>H2). For example, the depths H1 of the plurality of first recesses 410 may be 40 μm, and the depths H2 of the plurality of second recesses 420 may be 30 μm. The depths H1 of the plurality of first recesses 410 and the depths H2 of the plurality of second recesses 420 may be adjusted such that the depths H1 are smaller than the depths H2.

When the distances P1 or depths H1 of the first recesses 410 are different from the distances P2 or depths H2 of the second recesses 420, light diffusion characteristics may be further improved.

More specifically, when light enters voids located in the first recesses 410, a portion of light, refracted due to the refractive difference between the voids and the optical sheet, enters the second recesses 420 and is refracted due to the presence of voids in the second recesses 420. Consequently, light is diffused. When the distances P1 between the first recesses 410 and the distances P2 between the second recesses 420 are different, different numbers of recesses (i.e., different numbers of voids per area) are present in the same areas, thereby increasing light diffusion efficiency.

In particular, when the distances P1 between the first recesses 410 are greater than the distances P2 between the second recesses 420, more number of the second recesses 420 are provided in the same area, such that light diffusion through the second recesses 420 may be increased.

The distances P1 and P2 between the recesses may be properly adjusted depending on the wavelength of light having exited the light sources 220, the refractive index or thickness of the optical sheets, or the like, in order to improve light diffusion characteristics.

In addition, in the case in which the depths H1 of the first recesses 410 and the depths H2 of the second recesses 420 are different, it is possible to adjust the angle of light diffusion by causing light, which has entered and is refracted in the first recesses 410, to travel a different distance within the first recesses 410, thereby improving light diffusion efficiency.

The plurality of first recesses 410 and the plurality of second recesses 420 may be arranged on different layers or the same layer so as to be staggered from each other while being parallel to each other.

The centers M1 of the plurality of first recesses 410 are misaligned from the centers M2 of the plurality of second recesses 420 by predetermined distances, such that the plurality of first recesses 410 are staggered from the plurality of second recesses 420.

In this case, when a portion of light, refracted in the plurality of first recesses 410, enters the plurality of second recesses 420, which are spaced apart from each other by predetermined distances, the possibility of double refraction of light may be increased, thereby improving light diffusion efficiency.

Referring to FIG. 10, light-diffusing particles 1000, such as beads, may be provided on at least one surface of the top surface and the bottom surface of the optical sheet layer 240.

The light-diffusing particles 1000 are components for diffusing light having exited the light sources 220. The light-diffusing particles 1000 may be made of one selected from among a variety of materials, such as polystyrene, acrylic resin, silicone resin, glass, and silica. The size, arrangement, or the like, of the light-diffusing particles 1000 may be variously determined.

The light-diffusing particles 1000 may be bonded to at least one of the top surface and the bottom surface of the optical sheet layer 240 by coating, application (or painting), or the like.

When the diffusing particles 1000 are provided on the top surface and the bottom surface of the optical sheet layer 240, a bonding material, such as an adhesive resin, may be applied to the top portion of the light-diffusing particles 1000 and between the light-diffusing particles 1000 to be bonded to the bottom surface of the diffuser plate 250 or a portion of the guide panel 230.

Referring to FIG. 11, when the plurality of first recesses 410 and the plurality of second recesses 420 are uniformly arranged at the distances P1 and P2, horizontal surfaces (or planar surfaces) may be provided between adjacent recesses among the plurality of first recesses 410 and between adjacent recesses among the plurality of second recesses 420.

A bonding material layer 1100 may be applied to the horizontal surfaces. The horizontal surfaces, with the bonding material layer 1100 being applied thereto, may be bonded to one surface of the optical sheet.

The bonding material layer 1100 may be located on the plurality of first recesses 410 and the plurality of second recesses 420, be located within the plurality of first recesses 410 and the plurality of second recesses 420, or be located on the horizontal surfaces between the plurality of first recesses 410 and the horizontal surfaces between the plurality of second recesses 420. In FIG. 11, the bonding material layer 1100 is illustrated as being located in the first recesses 410, for the sake of brevity.

The bonding material layer 1100 may be made of an adhesive resin. For example, the bonding material layer 1100 may prepared by applying an adhesive resin to one surface of each of the optical sheets of the optical sheet layer 240.

The thickness T1 of the bonding material layer 1100 on the horizontal surfaces may be higher than the thickness T2 of the bonding material layer 1100 in the first recesses 410 or the second recesses 420 (T1>T2).

Since the thickness of the bonding material layer 1100 in the first recesses 410 or the second recesses 420, in which the voids acting to diffuse incident light are located, is relatively low, a greater amount of air can be accommodated in the voids, and the quantity of light absorbed to the bonding material layer 1100 can be minimized. Accordingly, both light diffusion efficiency and luminance can be improved.

Described in more detail with reference to FIG. 12, the first recesses 410 are illustrated as being located between the first optical sheet 441 and the second optical sheet 443 in FIG. 12.

A portion of light, which has entered the first optical sheet 441 after exiting the light sources 220, arrives at the horizontal surfaces between the first recesses 410, while another portion of light arrives at the first recesses 410.

The light portion, having arrived at the horizontal surfaces between the first recesses 410, passes through the bonding material layer 1100 and the second optical sheet 443, the refractive indices of which are similar to that of the first optical sheet 441. Due to the higher thickness T1 of the bonding material layer 1100, a greater amount of the light portion may be absorbed.

In contrast, the light portion, having arrived at the first recesses 410, is diffused while being refracted due to the difference between the refractive index (n=1) of the voids in the first recesses 410 and the refractive index (n=1.5 to 1.6) of the first optical sheet 441. A smaller amount of the refracted light portion is absorbed to the bonding material layer 1100, due to the relatively lower thickness T2 of the bonding material layer 1100. A greater amount of air may be accommodated in the voids of the first recesses 410.

FIG. 13 illustrates an exemplary method of fabricating some components of the display device according to exemplary aspects. Hereinafter, an exemplary method of laminating optical sheets will be described with reference to FIG. 13.

First, in S1310, a single optical sheet having recesses depressed inwardly from one surface thereof is fabricated by pressing a roller against a single rectangular flexible base film or plate. Pressing portions, in the shape of a sphere, a polygon, an inverted trapezoid, or the like, are provided on the outer circumference of the roller.

Afterwards, in S1320, a bonding material, such as an adhesive resin, is applied to the top surface of the optical sheet having the depressed recesses, using a device, such as a dispenser. In this manner, the bonding material layer 1100 is fabricated in S1330. The dispenser may apply the bonding material to the optical sheet along the recesses uniformly provided in the optical sheet by spraying the bonding material from a plurality of nozzles arranged in line. The dispenser may apply the bonding material to optical sheet by spraying the bonding material from a nozzle, which sprays the bonding material to a specific spot, while moving the nozzle over the entire top surface of the optical sheet. However, the present disclosure is not limited thereto, and the bonding material may be applied by a variety of methods, such as spin coating or painting.

Afterwards, in S1340, two optical sheets are laminated by bringing one surface of another optical sheet into contact with the surface of the optical sheet on which the bonding material layer 1100 is fabricated. In this procedure, air is maintained in the recesses arranged at regular distances, instead of being discharged therefrom, so that voids are fabricated between the optical sheets.

When three optical sheets are laminated in a similar manner, an optical sheet layer 240, as illustrated in FIG. 6, can be fabricated. The optical sheet layer 240 illustrated in FIGS. 7 to 9, which has not been discussed additionally, can be fabricated using a process similar to the fabrication process illustrated in FIG. 13.

The effects of the optical sheet layer 240, fabricated by the above-described method, will be described with reference to FIG. 14. In the related art, as illustrated in the left part of FIG. 14, when the light sources 220 are recognized on the active area of the display panel 110, darkly expressed regions were present on the active area, due to non-uniform light illumination, and relative light efficiency indicative of luminance was only about 70%.

In contrast, in the case of the display device 100 in which the optical sheet layer 240 is used, as illustrated in the right part of FIG. 14, the darkly expressed regions due to the recognition of the light sources 220 are removed from the active area of the display panel 110. Consequently, screen quality of display panel 110 can be improved, and an improvement in relative light efficiency to about 85% or higher can be appreciated.

As set forth above, according to exemplary aspects, the backlight unit and the display device can have a rigid structure, since a change in the optical layer is minimized even when exposed to hostile environments, such as high and low temperature environments.

In addition, according to exemplary aspects, the backlight unit and the display device can have a structure minimizing an effect on display performance by preventing the light sources from being directly recognized in the active area of the display panel.

Furthermore, according to exemplary aspects, the backlight unit and the display device can improve display performance by prevent degradations in the luminance and screen quality of the display panel.

Although all of the components constituting exemplary aspects have been described as being combined together or as operating in concert with each other, the present disclosure is not necessarily limited thereto. Rather, one or more components may be selected from the entire components to be combined together and operate in a combined form within the scope of the present disclosure.

It will be understood that the terms "comprise," "include," "have," and any variations thereof used herein are intended to cover non-exclusive inclusions unless explicitly described to the contrary. Unless otherwise specified, all terms including technical and scientific terms used herein have the same meaning as commonly understood by a person skilled in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The foregoing descriptions and the accompanying drawings have been presented in order to explain the certain principles of the present disclosure. A person skilled in the art to which the present disclosure relates could make various modifications and variations by combining, dividing, substituting for, or changing the elements without departing from the principle of the present disclosure. The foregoing aspects disclosed herein shall be interpreted as being illustrative, while not being limitative, of the principle and scope of the present disclosure. It should be understood that the scope of the present disclosure shall be defined by the appended Claims and all of their equivalents fall within the scope of the present disclosure.

What is claimed is:

1. A backlight unit comprising:
a plurality of light sources emitting light; and
an optical sheet layer including a first optical sheet and a second optical sheet bonded with each other and provided on a path of light exiting from the plurality of light sources and a first bonding material layer on at least one of a plurality of first recesses and a first horizontal surface between adjacent recesses among the plurality of first recesses,
wherein the light exited from the light sources enters the first optical sheet; the second optical sheet is disposed on the first optical sheet, and the light exited from the first optical sheet enters the second optical sheet, and a void present in the plurality of first recesses depressed inwardly from one surface of the first optical sheet or the second optical sheet, at a bonding area between the first optical sheet and the second optical sheet, and
wherein a thickness of the first bonding material layer on the first horizontal surface between adjacent recesses among the plurality of first recesses is greater than a thickness of the first bonding material layer in the at least one of the plurality of first recesses.

2. The backlight unit according to claim 1, wherein the optical sheet layer further comprises a third optical sheet bonded to a bottom surface of the first optical sheet or a top surface of the second optical sheet.

3. The backlight unit according to claim 1, wherein the optical sheet layer further comprises a third optical sheet bonded to a top surface of the second optical sheet, and
a void is present in a plurality of second recesses depressed inwardly from one surface of the second optical sheet or the third optical sheet, at a bonding area between the second optical sheet and the third sheet.

4. The backlight unit according to claim 3, wherein the plurality of first recesses and the plurality of second recesses are arranged at a same distance, and
the distance between the plurality of first recesses differs from the distance between the plurality of second recesses.

5. The backlight unit according to claim 4, wherein the distance between the plurality of first recesses are greater than the distance between the plurality of second recesses.

6. The backlight unit according to claim 3, wherein the plurality of first recesses has a depth different from a depth of the plurality of second recesses.

7. The backlight unit according to claim 6, wherein the depth of the plurality of first recesses are greater than the depth of the plurality of second recesses.

8. The backlight unit according to claim 3, wherein the plurality of first recesses and the plurality of second recesses are arranged to partially overlap each other while being parallel to each other.

9. The backlight unit according to claim 3, wherein a second horizontal surface is provided between adjacent recesses among the plurality of second recesses.

10. The backlight unit according to claim 9, further comprising a second bonding material layer on at least one of the plurality of second recesses,
wherein a thickness of the second bonding material layer on the second horizontal surfaces between the plurality of second recesses is greater than a thickness of the second bonding material layer in the plurality of second recesses.

11. The backlight unit according to claim 1, wherein the plurality of first recesses are arranged at a same distance.

12. The backlight unit according to claim 1, further comprising:
a diffuser plate disposed above the optical sheet layer and made of a transparent glass material; and
a luminance enhancement film disposed above the diffuser plate,
wherein a bottom surface of the diffuser plate is bonded to a top surface of the optical sheet layer.

13. The backlight unit according to claim 1, wherein at least one surface of a top surface and a bottom surface of the optical sheet layer includes a plurality of light-diffusing particles.

14. A display device comprising:
a cover bottom;
a plurality of light sources disposed above the cover bottom and emitting light;
an optical sheet layer including a first optical sheet and a second optical sheet bonded with each other and disposed above the plurality of light sources;
a display panel disposed above the optical sheet layer; and
a guide panel disposed outside the cover bottom and supporting a bottom portion of the optical sheet layer and a bottom portion of the display panel,
wherein the light exited from the light sources enters the first optical sheet; and the second optical sheet disposed on the first optical sheet, wherein the light exited from the first optical sheet enters the second optical sheet; and
a void present in a plurality of first recesses depressed inwardly from one surface of the first optical sheet or the second optical sheet, at a bonding area between the first optical sheet and the second optical sheet,
wherein the optical sheet layer further includes a bonding material layer on at least one of the plurality of first recesses and a horizontal surface between adjacent recesses among the plurality of first recesses, and
wherein a thickness of the bonding material layer on the horizontal surface between adjacent recesses among the plurality of first recesses is greater than a thickness of the bonding material layer in the at least one of the plurality of first recesses.

15. The display device according to claim 14, wherein the optical sheet layer further comprises a third optical sheet bonded to a top surface of the second optical sheet, and
a void is present in a plurality of second recesses depressed inwardly from one surface of the second optical sheet or the third optical sheet, at a bonding area between the second optical sheet and the third sheet.

16. The display device according to claim 15, wherein the plurality of first recesses and the plurality of second recesses are arranged at a same distance.

17. The display device according to claim 15, further comprising:
a diffuser plate disposed above the optical sheet layer and made of a transparent glass material; and
a luminance enhancement film disposed above the diffuser plate,
wherein a bottom surface of the diffuser plate is bonded to a top surface of the optical sheet layer.

18. The display device according to claim 17, wherein at least one surface of a top surface and a bottom surface of the optical sheet layer includes a plurality of light-diffusing particles.

19. A backlight unit comprising:
a plurality of light sources emitting light;
an optical sheet layer including first and second optical sheets bonded with each other and disposed on a path of light exiting from the plurality of light sources; and
a diffuser plate disposed on the optical sheet layer,
wherein the light exited from the light sources enters the first optical sheet, the second optical sheet is disposed on the first optical sheet, and the light exited from the first optical sheet enters the second optical sheet; and
the first optical sheet or the second optical sheet has a surface with a plurality of first recesses depressed inwardly at a same distance,
wherein the optical sheet layer further includes a bonding material layer on at least one of the plurality of first recesses and a horizontal surface between adjacent recesses among the plurality of first recesses, and
wherein a thickness of the bonding material layer on the horizontal surface between adjacent recesses among the plurality of first recesses is greater than a thickness of the bonding material layer in the at least one of the plurality of first recesses.

20. The backlight unit according to claim 19, further comprising a luminance enhancement film disposed on the diffuser plate, so that the diffuser plate is disposed between luminance enhancement film and the optical sheet layer.

* * * * *